United States Patent [19]  [11] Patent Number: 4,961,134
Crus et al.  [45] Date of Patent: Oct. 2, 1990

[54] METHOD FOR MINIMIZING LOCKING AND READING IN A SEGMENTED STORAGE SPACE

[75] Inventors: Richard A. Crus, San Jose; Donald J. Haderle, Los Gatos; James Z. Teng, San Jose, all of Calif.

[73] Assignee: International Business Machines Corporation, Armonk, N.Y.

[21] Appl. No.: 219,514

[22] Filed: Jul. 15, 1988

[51] Int. Cl.$^5$ ............................ G06F 12/00
[52] U.S. Cl. ............................ 364/200; 364/246; 364/246.3
[58] Field of Search ............... 364/200 MS, 900 MS, 364/300

[56] References Cited

U.S. PATENT DOCUMENTS

| 4,393,500 | 7/1983 | Imazeki et al. | 364/900 X |
| 4,627,019 | 12/1986 | Ng | 364/900 |
| 4,716,528 | 12/1987 | Crus et al. | 364/300 |
| 4,785,400 | 11/1988 | Kojima et al. | 364/300 |

OTHER PUBLICATIONS

W. Chu, et al., "Fault Tolerant Locking for Tightly Coupled Systems", Proceedings of the 5th Symposium on Reliability in Distributed Software and Database Systems, IEEE Computing Society Press, copyright 1986, pp. 49-55.

Primary Examiner—Raulfe B. Zache
Attorney, Agent, or Firm—Pryor A. Garnett

[57] ABSTRACT

A page-accessing method in a segmented tablespace 10 which eliminates unnecessary reading and locking. The tablespace comprises data pages 18 grouped into identically-sized segments 16, each segment storing data for a single table. A status indicator 26 for each data page of a segment is kept in a separate segment control block 20 stored on a space map page 14. Five data page status indicator values are maintained:

(1) FULL (26a) - entirely full of current data;
(2) PARTIALLY FULL (26b) - partially full of current data;
(3) UNFORMATTED (26c) - empty; contains no data;
(4) MASS DELETE (26d) - contains only obsolete data because of an unqualified deletion (mass delete) of data; or
(5) QUALIFIED DELETE (26e) - contains only obsolete data because of a qualified deletion of data.

When scanning over the data in a segment, UNFORMATTED and MASS DELETE pages are skipped. QUALIFIED DELETE pages are locked, and then skipped if they still contain only obsolete data when the lock is obtained. When inserting data into pages, preliminary reads of UNFORMATTED and MASS DELETE pages are avoided. Data integrity is ensured by placing integrity checking bits at the beginning and end of each page. If the bits contain the same value, the page's data integrity is intact. If the bits are different, the page's previous consistent contents are recovered from the log records.

6 Claims, 3 Drawing Sheets

METHOD FOR MINIMIZING LOCKING AND READING IN A SEGMENTED STORAGE SPACE

BACKGROUND OF THE INVENTION

1. Technical Field

This invention relates to computerized data processing systems, and more particularly to the deletion, locking, and reading of data stored in segmented storage.

2. Description of the Prior Art

Computerized data base management systems rely on very high-speed central processing units for the manipulation and processing of data, and on much slower physical storage devices for permanent storage of the data. When physically stored data is required for processing it is transferred from the storage device to a buffer, where it can be read, updated, or otherwise processed. If after processing the page's contents in the buffer have been updated, the page is copied back to physical storage to replace the data which was previously stored. Buffers can reside in either high-speed electronic storage (real storage) such as the main memory of a central processing unit (CPU), or in high-speed physical storage devices (paging devices).

Each transfer of a page of data from physical storage to a buffer, a process known as "buffer paging", requires either about 2 milliseconds (ms) or 20 ms, depending on whether the page was accessed sequentially (immediately after the preceding stored page) or randomly. In typical large data bases having millions of records of data distributed over perhaps 100,000 data pages, randomly reading the entire data base would require over one-half hour for buffer paging alone. Any reduction in the number of data pages required to be paged into the buffers translates into a direct, significant improvement in the data base's performance. It is therefore desirable to minimize buffer paging by eliminating unnecessary requests to read pages of data.

The technique known as "page level locking" is used in data base management systems to allow a data base to be concurrently accessed or updated by multiple users or programs. Using page level locking, each page that is accessed or updated by a user or program is "locked" to prevent simultaneous access or updating by any other user or program. Locking is an expensive operation which uses much CPU time, and may seriously reduce the system's performance and response time. It is therefore desirable to minimize locking without sacrificing the concurrency control required for effective use by multiple users.

W. Chu et al., "Fault Tolerant Locking for Tightly Coupled Systems", Proceedings of the 5th Symposium on Reliability in Distributed Software and Database Systems, IEEE Computing Society Press, copyright 1986, pp. 49-55, disclose a fault-tolerant locking protocol in which a lock word containing the status of a group of records is appended to that group. The processor consults a status table before accessing the group. Statuses recorded are: free, locked, update initiated, or failed.

Data base management systems use log records to allow failed transactions or operations to be undone. This capability is critical because if the transaction or operation fails midway through its completion, some data will have been changed while other data will remain in its previous state. The log records written up to the point of the failure can be used to restore or roll back the table to its original condition, so that the transaction or operation can be begun again. Once a transaction or operation has been completed and its changes to the data can be made permanent, the transaction or operation is "committed". After its commitment, a transaction or operation cannot be undone.

One important class of data base management systems is relational data base management systems. In a relational data base management system, data is perceived to exist in one or more tables or "relations", each consisting of a specific number of columns and a variable number of unordered rows or "records". The advantage of relational data base management systems is that their data can be accessed by referring to its content instead of its specific organization or location in storage.

In the past, the deletion of the entire contents of a large data entity, such as a relational data base table, a process also known as a mass delete or an unqualified delete, has required a great deal of time for large data entities. This is because the mass delete process must delete the entity's records (rows) one by one, writing a log record for every deleted record.

SUMMARY OF THE INVENTION

One object of this invention is to minimize the amount of buffer paging in data base management systems, by reducing the number of pages read, and by reducing page locking.

Another object of this invention is to reduce the time required for the mass deletion of a relational data base tables.

These and other objects are achieved by methods of reading and inserting data into pages in a physical storage space in which each data page contains only data for a single data entity and in which the status of each page is stored separately from that page. In both methods, the storage space is locked during deletion of all of the data belonging to a data entity. In both methods, also, pages containing only obsolete data because of the deletion of all of the data entity's data are treated the same as pages containing no data.

In the method for reading pages, pages containing at least some current data are both locked and read. Pages containing only obsolete data because of the deletion of less than all of the data entity's data are locked, and after the lock is obtained they are read only if they then contain current data. Pages containing no data, or only obsolete data due to the deletion of all of the data entity's data, are neither locked nor read.

In the method for inserting data into pages, pages containing current data and pages containing only obsolete data because of a deletion of less than all of the data entity's data, are locked and read before data is inserted into them. Data is inserted immediately into pages containing no data or containing only obsolete data because of the deletion of all of the data entity's data, without first reading such pages.

Other features and advantages of this invention will become apparent from the following detailed description of its preferred embodiment, taken in conjunction with the accompanying drawings.

DESCRIPTION OF THE PREFERRED EMBODIMENT

The Segmented Tablespace

The contents (rows) of relational data base tables are normally stored in physical storage in "tablespaces". To form a tablespace, one or more areas of physical storage are logically concatenated together to form a single, linear addressing range (i.e., starting from zero to 64 gigabytes). The tablespace is divided (formatted) into pages of fixed size, and all pages within the tablespace are uniquely identified by their relative page number. Each tablespace is associated with a group or pool of buffers in which the buffer size is equal to the page size of the tablespace.

A segmented tablespace is a particular type of tablespace distinguished by its scheme of internal data organization and space management. Segmented tablespaces typically include a header page, space map pages, and data pages. The data pages store the actual data, while the header and space map pages provide a framework for rapidly accessing the data pages.

The data pages are grouped into segments which are uniquely identified by their relative segment numbers. The segments are of equal size and form the fundamental unit of storage in the tablespace. All of the data pages in a given segment contain data for that segment's table only. As tables require additional storage, more segments are assigned to them.

The segments are themselves grouped, and each segment group is preceded by a space map page which contains entries known as segment control blocks for each of the space map page's segments. The segment control blocks for each table are chained together by pointers. The header page identifies the space map pages in the same way that the space map pages identify the segments, creating a hierarchical storage structure within the segmented tablespace.

Figure 1:
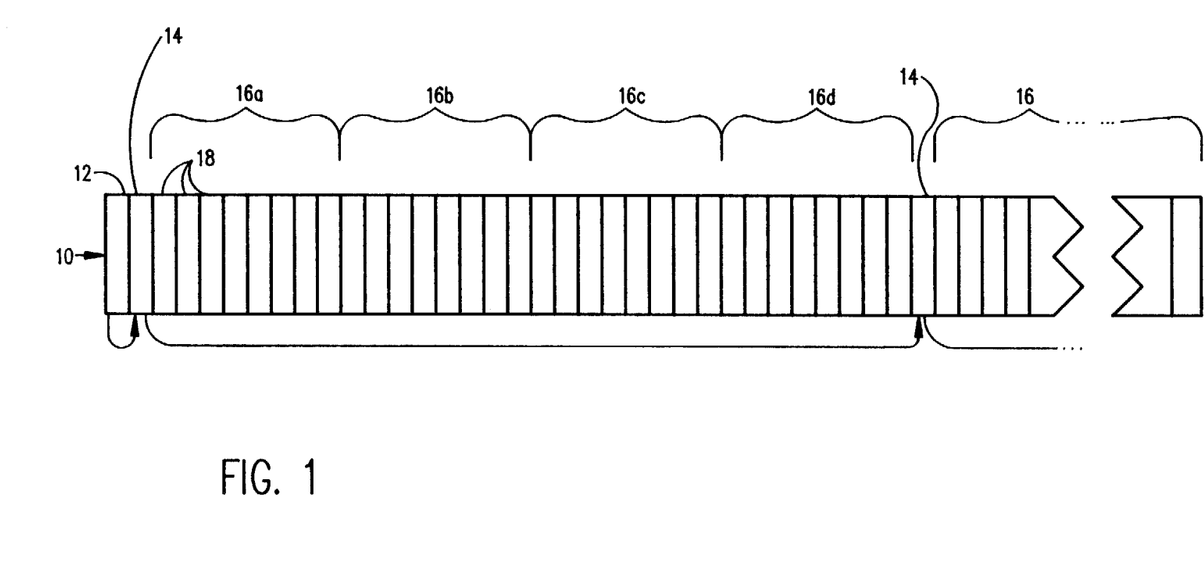
FIG. 1 shows a segmented tablespace as required for the method of the preferred embodiment of this invention.

FIG. 1 shows a typical segmented tablespace 10 in which the methods of this invention are particularly useful. The tablespace is made up of a large number of pages of equal size. The first page in the tablespace 10 is the tablespace header 12, of which there is one for the entire tablespace. The tablespace header 12 contains the tablespace identifier, and other information related to the tablespace as a whole. The remainder of the tablespace consists of space map pages 14, each followed by a number of segments 16. Each segment 16 consists of a number of data pages 18. Only the data pages 18 contain data from rows of tables. The space map pages and the header page provide a hierarchical organization which facilitates access to data stored on individual data pages.

Figure 2:
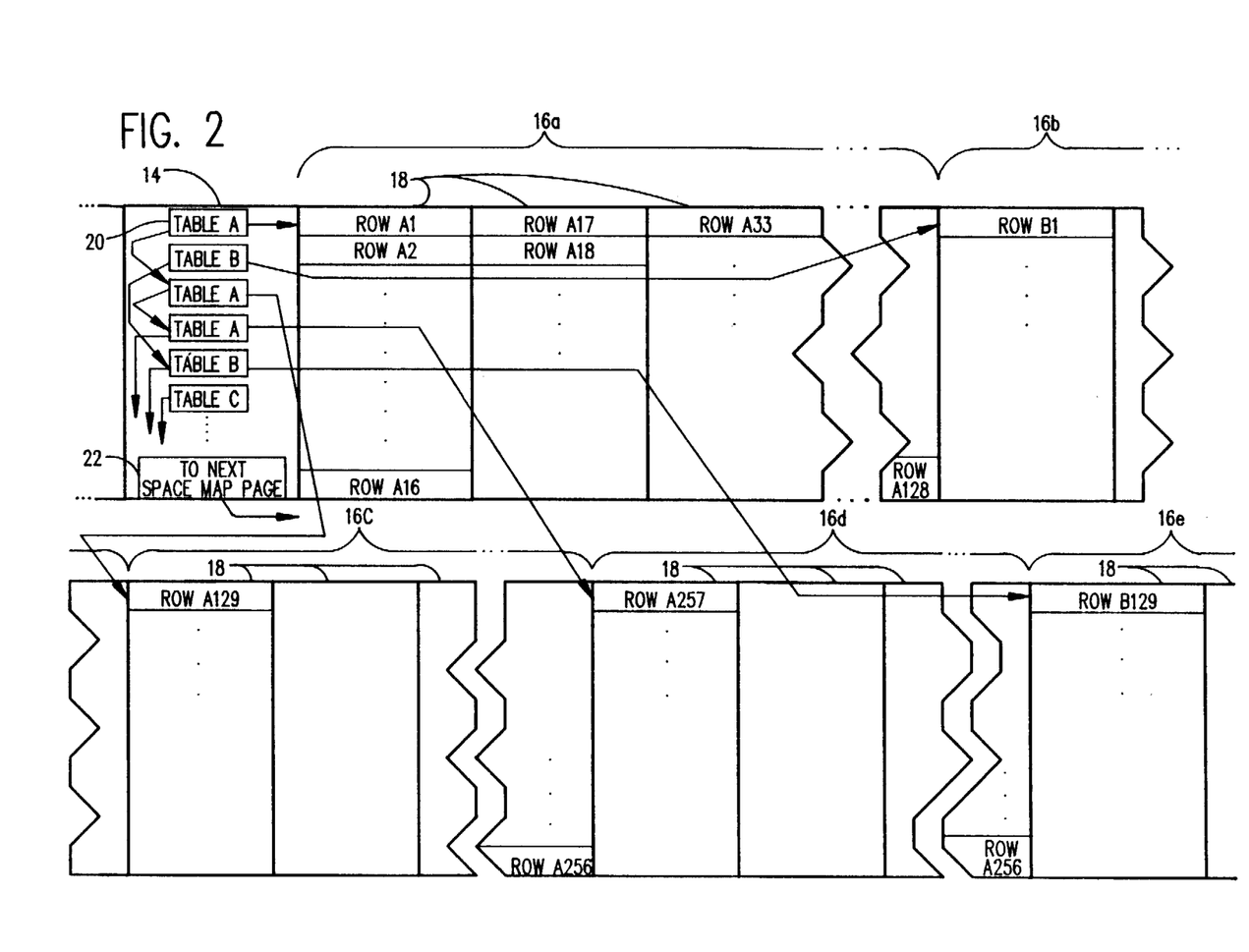
FIG. 2 shows a single segment of the segmented tablespace of FIG. 1 and its associated space map page.

A space map page 14 and its succeeding segments 16a, 16b, ... are shown in FIG. 2. The space map page 14 includes a list of segment control blocks 20, and a pointer 22 to the next space map page. The segments 16a, 16b, ... following the space map page 14 contain a number of data pages 18, each of which stores the data for several rows of the table. Because the tablespace 10 is segmented, all of the data pages 18 within a given segment 16 contain rows for the same table. Adjacent segments 16 may contain data for the same or different tables. Each segment 16 has a corresponding segment control block 20.

Figure 3:
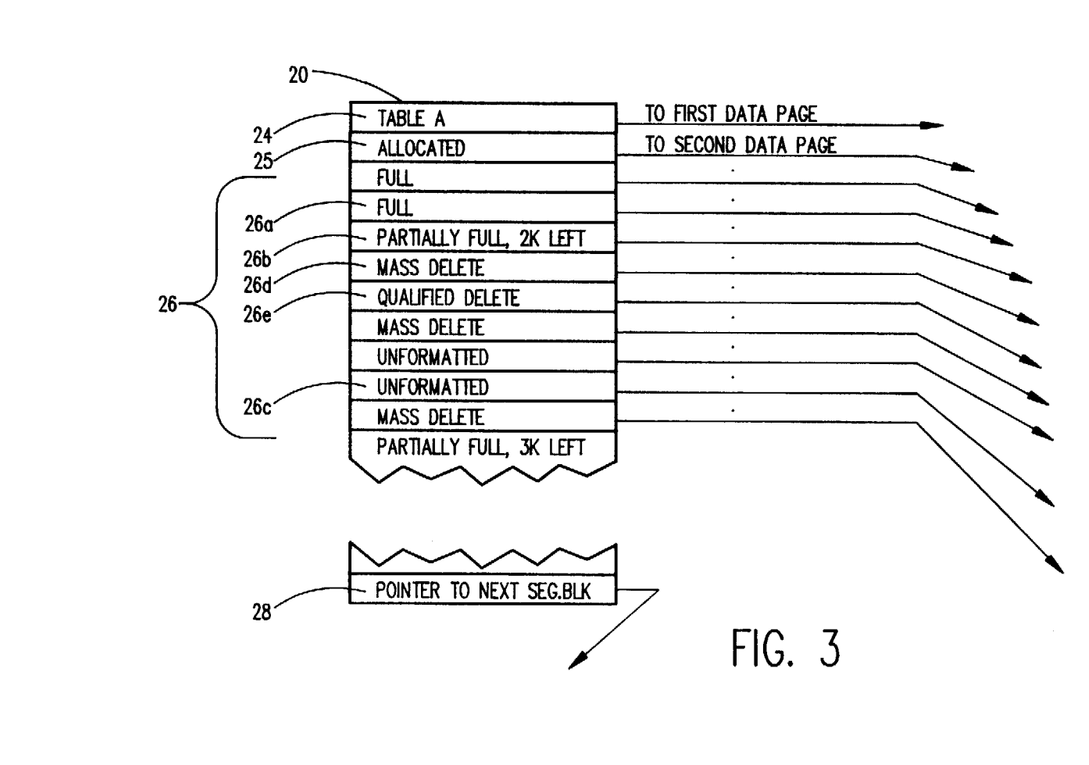
FIG. 3 shows the format of a segment control block of the space map page of FIG. 2.

A typical segment control block 20 is shown in FIG. 3. Each segment control block 20 includes a table identifier 24, a segment status indicator 25, a number of data page status indicators 26, and a pointer 28 to the next segment control block for the same table. These pointers 28 create chains of segment control blocks 20 belonging to the same table, as seen in FIG. 2. The segment control block 20 for a given segment 16 contains a respective one of the data page status indicators 26 for indicating the status of each data page 18 within that segment. Five different values (26a-e) of this status indicator are:

(1) FULL (26a) - the data page is entirely full of current data;

(2) PARTIALLY FULL (26b) - the data page is partially full of current data;

(3) UNFORMATTED (26c) - the data page is unformatted, containing no data;

(4) MASS DELETE (26d) - the data page contains only obsolete data as a result of an unqualified or mass deletion of a table; and (5) QUALIFIED DELETE (26e) - the data page contains only obsolete data as a result of a qualified deletion in which less than all of the data in a table was deleted.

A preferred method for mass deleting all of the rows of a data base table is described next.

Mass Delete in a Segmented Tablespace

In a segmented tablespace such as that shown in FIGS. 1 and 2, a new method for efficiently performing a mass delete of an entire table has been discovered. This new mass delete operation does not access, lock, or log the data pages 18 of the table. Instead, the mass delete operation only scans the segment control blocks 20 of the subject table, marking their respective segment status indicators 25 as FREE (deallocated). The first segment 16 of the table is not deallocated in order to allow for subsequent insertion of data. Logging is done for the deallocated space map pages 14 to ensure the mass delete can be backed out (undone).

The segment control block's page status indicators 26 are set to MASS DELETE to show that those pages have been deleted as part of a mass delete operation. When the segments 16 containing these data pages are reallocated, the page status indicators 26 are not changed to identify them to the data base management system. This is necessary because special action must be taken before new data is inserted into mass-deleted data pages 18. The MASS DELETE page status indicator 26d indicates that the data page is logically empty. Mass-deleted pages thus contain no active or current data —only obsolete data which was not erased during the mass delete operation. By avoiding the erasure of obsolete data, the time required for a mass delete operation is reduced tremendously since page accesses and log records are not required for the data pages.

Table 1 contains an illustrative pseudocode implementation of the mass delete operation of this invention.

TABLE 1

| Pseudocode for Mass Delete in Segmented Tablespace |
| --- |
| 101    Lock the table in exclusive mode.<br>       /= prevent other accesses to the same =/<br>       /= table =/ |
| 102    Acquire a "mass delete" type lock for the table to prevent uncommitted free segments from being reused by any agents including itself.<br>       /= this lock will be released when the =/<br>       /= mass delete operation is committed =/ |

TABLE 1-continued

| | Pseudocode for Mass Delete in Segmented Tablespace |
|---|---|
| 103 | DO LOOP for each segment 16 of the table. /= follow the table's segment chain =/ |
| 104 | Access the space map page 14 containing the segment control block 20 for the segment 16. |
| 105 | IF it is the first segment 16 of the table THEN. |
| 106 | Write a log record of the before and after images of the segment control block 20. |
| 107 | Change all data page status indicators 26 of the segment control block 20 to MASS DELETE. |
| 108 | ELSE. /= not the first segment of the table =/ |
| 109 | Write a log record of the before and after images of the segment control block 20. |
| 110 | Change the segment status indicator 25 to FREE to identify the segment as a mass-deleted free segment, without resetting the control block's internal table identifier 24. |
| 111 | Change all data page status indicators 26 of the segment control block 20 to MASS DELETE. |
| 112 | END LOOP /= process all segments 16 of the table =/ |

It is essential that no other transaction or operation be performed on a table being mass deleted. Line 101 of Table 1 ensures this by locking the table in exclusive mode, thereby preventing other users or programs from accessing any data in that table. At the same time, in line 102 a "mass delete" type of lock is acquired to prevent uncommitted (not yet permanent) free segments from being reused by any user or application program including the mass delete operation. This mass delete lock is thus acquired in exclusive mode, and will be released only when the mass delete operation is permanent and committed.

The mass delete operation then accesses each segment of the table by following the table's chain of segment control blocks. The space map pages 14 are accessed as required for each segment 16 of the table. The first segment 16 of the table is handled slightly differently from the succeeding segments (lines 105-107). For both, a log record is written to log the before and after images of the segment control block 20 of the segment. If the segment is not the first segment on the chain (lines 108-111), the segment control block is marked as a mass-deleted free segment, although the segment's table identifier 24 is left unchanged. A nonzero segment table identifier 24 is used to indicate that the segment cannot be reallocated while an uncommitted mass delete is in progress for the table previously associated with that segment. The final step for each segment, in lines 107 and 111 of Table 1 is to mark all data pages of the segment as having been mass deleted, for use when those pages are allocated to other tables. The DO-loop between lines 103 and 112 is repeated for every segment of the table by following the chain of segment control blocks 20. After the last segment has been processed, the mass delete operation is complete and can be committed.

A drop table operation, in which the table is not retained for subsequent insertion of data, operates the same as a mass delete except that the first allocated segment for the table is also deallocated, since no further data will be inserted into the table.

Minimizing Locking and Reading of Empty Pages

The principal objective of this invention is to attempt to minimize locking and reading of data pages 18 that are physically or logically empty. A "physically" empty page contains only binary zeroes - no data at all. Somewhat similarly, a "logically" empty page contains no valid data, but is not reset to binary zeroes. A logically empty page can be caused by a mass delete (i.e., unqualified delete of all the data in a table) or by a qualified delete of less than all the table's data. Thus, physically empty pages contain no data, logically empty pages contain only obsolete data, and all other pages partially or fully contain current (i.e., active or valid) data.

To achieve this objective, each data page's status must be stored separately from the page 18 itself, so that the page need not be read if it is empty. This indication is stored in the segment control block 20 as that page's respective one of the status indicators 26. One of the five status indications described above should be stored for each data page 18. Each status indication corresponds to a unique state of the data page.

The first status indication FULL 26a is set when no more data can be added to the page 18. During read operations, these pages are first locked and then read. FULL pages are ignored during insert operations.

The second status indication PARTIALLY FULL 26a is set when a page contains at least some current or valid data. During a read operation, these pages are first locked and then read normally, like FULL pages. For variable length rows (i.e., rows of tables which contain at least one variable length column), this second status indication can further be subdivided into multiple settings to more accurately represent the amount of free space left on the data page, thereby improving the utilization of the physical storage device by packing more rows into the data pages.

The third status indication UNFORMATTED 26c is set for physically empty pages, i.e., pages 18 which are empty with their contents guaranteed to be only binary zeroes. When a space map page 14 is first formatted, all data pages 18 covered by that space map are set to this state before those pages can be utilized. During a read operation, UNFORMATTED pages are neither locked nor read, since they contain no data. Similarly, when data is to be inserted into these pages they are not first read, since there is no preexisting data to be concerned about. However, the requested page is logged, and an empty buffer reset to binary zeroes is assigned to the page and it is formatted as a data page containing no data.

The fourth status indication MASS DELETE 26d is set when a page 18 becomes logically empty because of a mass delete (or drop table) operation. This state indicates that the contents of the page can be ignored even though the page has not been reset to binary zeroes. Pages with this status indication contain no valid data. As described above for Table 1, the mass delete operation changes all the page status indicators 26 of the table's segment control blocks 20 to the fourth status indication MASS DELETE. During a read operation, MASS DELETE pages are neither locked nor read since they contain no current data. There is no danger that a concurrent mass delete will be uncommitted and undone because an exclusive lock on the table is held by the mass delete operation so that another user or application cannot start a read operation for the table while the mass delete is being performed. During an insert operation, a MASS DELETE page (like an UNFORMATTED page) is not first read, since it contains only obsolete data. However, before any data is inserted into the page, an empty buffer is assigned and the page is formatted. In this formatting process, the page is first reset to binary zeroes, and then the page header and trailer are set to indicate the page contains no data.

The fifth status indication QUALIFIED DELETE 26e is set when a page 18 becomes logically empty as the result of a predicate or qualified delete. This type of delete statement is suffixed by conditions which usually cause only some of the table's records to be deleted. During read operations, QUALIFIED DELETE pages are first checked to ensure that their logically empty state was not caused by an uncommitted delete. This checking is done by requesting, waiting for, and finally acquiring a lock on the page. After the lock is acquired, the read operation skips over the page if it is still logically empty and contains only obsolete data. When data is to be inserted into a QUALIFIED DELETE page, the page will be read.

Relation Scan in the Segmented Tablespace

Table 2 shows a pseudocode implementation of a type of read operation known as a relation or table scan according to the preferred embodiment of this invention. A table scan sequentially reads a number of pages of a table's data.

TABLE 2

| | Pseudocode for TABLE Scan in Segmented Tablespace |
|---|---|
| 201 | DO LOOP for each segment 16 of the table. /= follow the table's chain of segment control =/ /= blocks 20 between and across space map =/ /= pages 14 =/ |
| 202 | Access the space map page 14 for the segment 16, and read the segment's segment control block 20. |
| 203 | DO LOOP for each data page 18 of the current segment 16 /= follow the list of data page status =/ /= indicators 26 within the segment =/ /= control block 20 =/ |
| 204 | SELECT the one of the data page status indicators 26 for the current data page. |
| 205 | CASE (indicator is "UNFORMATTED"or "MASS DELETE") /= page is physically empty and not =/ /= yet formatted, or is logically =/ /= empty because of mass delete =/ |
| 206 | DO nothing. /= page will not be locked or =/ /= read =/ |
| 207 | END. |
| 208 | CASE (indicator is "QUALIFIED DELETE") /= page is logically empty because of =/ /= a qualified delete =/ |
| 209 | DO. |
| 210 | IF table level lock is held by the table scan operation THEN /= no other user or application =/ /= can change the contents of =/ /= this data page =/ |
| 211 | DO nothing. /= page will not be locked =/ /= and read =/ |
| 212 | END. |
| 213 | ELSE. /= page level locking is active =/ |
| 214 | DO. |
| 215 | Lock the page in shared mode. |
| 216 | IF page becomes non-empty THEN /= page contains some =/ /= current data =/ |
| 217 | DO. |
| 218 | IF the data page is not already in a buffer THEN |
| 219 | Assign a buffer to the data page. |
| 220 | Access the data page and |

TABLE 2-continued

| | Pseudocode for TABLE Scan in Segmented Tablespace |
|---|---|
| | read it. |
| 221 | ELSE. |
| 222 | Read the page in the buffer. |
| 223 | END. |
| 224 | ELSE. /= page is still =/ /= logically empty, =/ /= containing only =/ /= obsolete data =/ |
| 225 | DO nothing. /= page will not be =/ /= read =/ |
| 226 | END |
| 227 | END. |
| 228 | CASE (indicator is "PARTIALLY FULL" or "FULL") /= page contains at least some =/ /= current data =/ |
| 229 | DO. |
| 230 | IF table level lock is held by the table scan operation THEN /= Shared page lock is not =/ /= needed because table level =/ /= lock is held. =/ |
| 231 | DO nothing. /= page will not be locked =/ |
| 232 | END. |
| 233 | ELSE. /= page level lock is required =/ |
| 234 | Lock the page in shared mode. |
| 235 | IF the data page is not already in a buffer THEN |
| 236 | Assign a buffer to the data page. |
| 237 | Access the data page and read it. |
| 238 | ELSE. |
| 239 | Read the page in the buffer. |
| 240 | END. |
| 241 | END SELECT. /= finished evaluating =/ /= status indicator of =/ /= current page =/ |
| 242 | END LOOP. /= repeat inner loop for next data =/ /= page =/ |
| 243 | END LOOP. /= repeat outer loop for next segment =/ /= of table =/ |

The relation scan shown in pseudocode in Table 2 essentially consists of an outer DO-loop over the segments 16 of the table, an inner DO-loop over the data pages 18 of each segment, and within the inner DO-loop a SELECT structure having three alternate CASE statements at lines 205, 208, and 223 for processing the data page according to the value in its status indicator 22 in the segment control block 20 of the space map page 14.

The outer DO-loop between lines 201 and 243 processes each segment 16 of the table by following the table's chain of segment control blocks 20 through the space map pages 14. Each space map page 14 having a segment control block 20 for a segment 16 of the table is accessed at line 202.

The inner DO-loop between lines 203 and 242 processes every data page 18 in the current segment 16, since the segmented tablespace requires each segment to contain only data for a given data entity such as a table. The inner DO-loop reads through the list of data page status indicators 26 of the segment control block 20, and processes each indicator's corresponding data page 18 according to the indicator's value using a SELECT structure.

The SELECT structure between lines 204 and 241 includes three alternate CASE statements at lines 205, 208, and 228 for processing the different values of the data page status indicators 26. The first CASE statement at line 205 causes the table scan operation to skip over physically empty pages having status indicator values of "UNFORMATTED", and data pages which are logically empty because of a mass delete and therefore have an indicator value of "MASS DELETE". Because both of these types of data pages 18 contain no valid or current data, they can be ignored. Thus, in lines 206 and 207 nothing is done, i.e., the page is not locked or read.

The second CASE statement at line 208 handles data pages 18 which are logically empty because of a qualified delete. If the relation scan operation has acquired a table level lock over the entire table, no other user or application can operate concurrently on that table. Accordingly in lines 210-212, "QUALIFIED DELETE" pages may be ignored since they contain only obsolete data and their content cannot be changed by a concurrent user or application. Again, an unnecessary lock and read access is avoided. If the relation scan does not have a table level lock, and page level locking is active instead, lines 213-227 are executed to request a shared lock on the page (line 215) and if the page contains at least some current data when the lock is obtained (line 216) to access and read the page (lines 217-223). If when the lock is obtain the page is still logically empty and contains only obsolete data (line 224), then the page can safely be ignored and nothing is done, again avoiding unnecessarily locking and reading a logically empty data page.

The third CASE statement at line 228 captures "PARTIALLY FULL" or "FULL" values of the data page status indicators 26, which identify pages 18 which contain at least some current data. Unless the table scan operation has acquired a table level lock on the table (lines 230-232), the page is locked in shared mode (lines 233-234). Then if it is not already in a buffer, the data page is accessed and read.

The SELECT structure ends on line 241, and the inner DO-loop (lines 203-242) is repeated for the next data page 18. When the last data page of the current segment 16 has been processed through the inner DO-loop, the outer DO-loop (lines 201-243) is repeated for the next segment 16 of the table until the entire table has been scanned.

Insertion Into the Segmented Tablespace

Table 3 shows a pseudocode implementation of a method for inserting data into a data page 18 in a segmented tablespace 16 according to this invention.

TABLE 3

| | Pseudocode for Insert in Segmented Tablespace |
|---|---|
| 301 | DO LOOP for each segment of the table until a non-FULL page is located. /= follow the table's chain of segment control =/ /= blocks between and across space map pages =/ |
| 302 | Access the space map page for the segment, and read the segment's segment control block. |
| 303 | DO LOOP for each data page of the current segment until a non-FULL data page is located. /= follow the list of data page status =/ /= indicators within the segment =/ /= control block =/ |
| 304 | IF page's status indicator is not "FULL" THEN /= page can receive more data =/ |
| 305 | IF table level lock is held by the insert operation THEN |

TABLE 3-continued

| | Pseudocode for Insert in Segmented Tablespace |
|---|---|
| 306 | DO nothing. |
| 307 | END. |
| 308 | ELSE. |
| 309 | DO. |
| 310 | Lock the page conditionally in exclusive mode. |
| 311 | IF lock is acquired THEN |
| 312 | EXIT from inner and outer loops. /= proceed with =/ /= insertion of data =/ |
| 313 | ELSE. |
| 314 | DO nothing. /= continue through =/ /= inner and outer =/ /= loops =/ |
| 315 | END. |
| 316 | END. |
| 317 | ELSE. /= no room for more data to be =/ /= inserted =/ |
| 318 | DO nothing. /= continue through inner and =/ /= outer loops =/ |
| 319 | END. |
| 320 | END DO for each data page of the current segment. /= repeat inner loop for next data page =/ |
| 321 | END DO for each segment of the table /= repeat outer loop for next segment =/ |
| | /= allocate a new segment: =/ |
| 322 | IF no non-FULL page is found THEN /= no room in existing segments - add a new one =/ |
| 323 | DO. |
| 324 | Allocate a new segment for the table. |
| 325 | IF table level lock is not held by the insert operation THEN |
| 326 | Lock the first page of this new segment in exclusive mode. |
| 327 | Add this new segment to the end of the table's segment chain. |
| 328 | END. |
| 329 | END IF. |
| | /= format or read the page as necessary =/ |
| 330 | DO. |
| 331 | SELECT the data page status indicator for the current data page. |
| 332 | CASE (indicator is "UNFORMATTED") /= page is physically empty and not yet =/ /= unformatted and need not be accessed and =/ /= read =/ |
| 333 | DO. |
| 334 | Assign an empty buffer (set to binary zeroes) to the page. |
| 335 | Write a format log record with a REDO ONLY log indicator. |
| 336 | Format the page as containing no data. |
| 337 | END. /= continue with the log and insert at =/ /= 353-364 =/ |
| 338 | CASE (indicator is "MASS DELETE") /= page is logically empty because of a mass =/ /= delete, and need not be accessed and read =/ |
| 339 | DO. |
| 340 | Assign an empty buffer (set to binary zeroes) to the page. |
| 341 | Write a format log record with - a REDO ONLY log indicator, and - a NON-ZERO PHYSICAL PAGE log indicator. /= for use during a system restart to =/ /= check for inconsistent stored data =/ |
| 342 | Format the page as containing no data. |
| 343 | END. /= continue with the log ad insert at =/ /= 353-364 =/ |
| 344 | CASE (indicator is "QUALIFIED DELETE" or "PARATIALLY FULL") /= page is logically empty because of a =/ /= qualified delete or is partially full of =/ /= current or valid data, and must be read in =/ |

TABLE 3-continued

Pseudocode for Insert in Segmented Tablespace

```
             /= order to log its before image =/
345   DO.
346      IF the data page is not already in a buffer THEN
347         Assign a buffer to the data page.
348         Access the data page and read it.
349      ELSE.
350         Read the page in the buffer.
351      END.
             /= continue with the log and insert at =/
             /= 353-364 =/
  :
352   END SELECT. /= finished formatting and reading, =/
             /= which depend on the page's status =/
             /= indicator =/
  :
             /= log the insertion and insert the new data =/
353   DO.
354      Write a log record of the before and after images
            of the data page.
355      Insert the new data into the data page.
356   END.
  :
             /= update the data page's status indicator =/
357   DO.
358      IF the data page is now full THEN
             /= page cannot receive more data =/
359         Set page's status indicator in segment control
               block to "FULL"
360      ELSE. /= page can still receive more data =/
361         Set page's status indicator in segment control
               block to "PARTIALLY FULL"
362      Write a log record of the before and after images of
            the space map page.
363      Update the segment's segment control block on the
            space map page.
364   END.
```

The pseudocode implementation in Table 3 of an insert operation has two major parts: a set of two nested DO-loops (lines 301–321) for locating a data page 18 into which new data can be inserted; and a subsequent series of modules (lines 322–329, 330–352, 353–356, and 357–368) for locking, formatting, reading, logging, and inserting data into the page and for updating the page's status indicator 26 in the segment control block 20 on the space map page 14.

The nested DO-loops between lines 301 and 321 locate the first available data page 18 into which the new data can be inserted. The outer loop between lines 301 and 321 loops over the segments 16 of the table by following the table's chain of segment control blocks 20 along the space map pages 14 of the tablespace. The inner DO-loop between lines 303 and 320 reads down the list of data page status indicators 26 of the segment control block 20 until a nonfull data page 18 is located. When a status indicator 26 other than "FULL" is found (lines 304), the DO-loops are exited and the series of modules for locking, formatting, reading, etc. are begun. If all the data pages 18 in the segment 16 are indicated as being full (line 317), the inner DO-loop is exited and the outer loop repeated for the next segment 16 until a nonfull data page 18 is located. If no non-FULL page is found, a new segment is allocated to the table (lines 322–329).

Once the data page 18 has been locked, it is reformatted in lines 332–343 or read in lines 344–351 as necessary. The action taken depends on the value of the page's respective one of the status indicators 26. Pages 18 having "UNFORMATTED" and "MASS DELETE" indicators 26 are reformatted without being first read, while pages having indicators "PARTIALLY FULL" or "QUALIFIED DELETE" must be read without being reformatted. A SELECT structure between lines 331 and 352 contains three alternate CASE statements (lines 332, 338, and 344) which process "UNFORMATTED", "MASS DELETE", and "PARTIALLY FULL" or "QUALIFIED DELETE" status indicators 26, respectively.

If the page is UNFORMATTED, it does not need to be read before data is inserted. Accordingly, an empty buffer (set to binary zeroes) is assigned to the page (line 334), a format log record is written with the log indicator REDO ONLY (line 335), and the empty buffer is then formatted as a page containing no data (line 336). The buffer is then ready to have the new data inserted and to then be logged and written to physical storage.

MASS DELETE pages containing only obsolete data as a result of a mass delete are processed in lines 338–343. Like unformatted pages, mass-deleted pages are not read. Instead, an empty buffer set to binary zeroes is assigned to the page, and a format log record is written (lines 340–341). The format log record written when a mass-deleted page is reformatted includes the REDO ONLY log indicator plus a NONZERO PHYSICAL PAGE log indicator. The NONZERO PHYSICAL PAGE log indicator is used during a system restart to check for inconsistent stored data, as described below under the heading "Data Integrity". After the format log record has been written, the now empty buffer is formatted with the header and footer for a page containing no data (line 342), leaving the page ready for the logging and insertion module at lines 353–364.

If the page 18 into which the new data will be inserted is PARTIALLY FULL or QUALIFIED DELETE (logically empty because of a qualified deletion leaving the page containing only obsolete data), the page 18 must not be reformatted but must instead be accessed and read so that a "before image" of its preexisting contents may be logged. The CASE statement at line 344 identifies these pages, which are accessed and read in lines 345–351, and then processed in the logging and insertion module at lines 353–364.

Once the data page 18 has been reformatted or read as necessary, the logging and insertion module of lines 353–364 writes a log record of the before and after images of the page and inserts the new data into the page. The insertion at line 355 includes writing the new contents of the page 18 to physical storage.

The final step of the insertion operation is to update the data page's respective one of the status indicators 26 in its segment control block 20 of the space map page 14 (lines 357–364). If the new insertion has filled the page so that it cannot receive any more data (line 358), the page's status indicator is set to "FULL" (line 359). Otherwise, the page's status indicator 26 is set to "PARTIALLY FULL" (lines 360–361). A log record of the before and after images of the space map page is written at line 362, and the segment control block 20 containing the revised data page status indicator 26 is updated on the space map page 14 (line 363). This updating includes transferring the updated space map page 14 to physical storage.

Data Integrity in the Segmented Tablespace

A data base management system must prevent a user or application from accessing inconsistent data. This need for data integrity is an essential requirement for a usable data base management system. A data page 18 can contain inconsistent data if the system crashes while the page is being transferred from a buffer to physical storage, leaving the first part of the physically stored page containing updated data and the last part of the page containing obsolete data.

The preferred method for detecting this condition is to maintain two integrity checking bits: one at the beginning of the page and one at the end. In a page containing consistent data, these two bits will have the same value (i.e., either both will be ON or both will be OFF). A page's data will be treated as inconsistent if the integrity bits are different. Every time a page is transferred to physical storage, the integrity bits are inverted (changed from OFF to ON, or from ON to OFF). If the page is only partially transferred, the integrity bits will not match.

As mentioned earlier, a read I/O (i.e., a page access and read) is not performed when a logically empty page caused by a mass delete is used for an insert operation. Since no read I/O is performed, the values of the integrity bits for the physically stored page are not known. This leaves open the possibility that an inconsistent condition could not be detected if the reused page containing the newly inserted data was only partially transferred to physical storage, since the new integrity bit at the head of the page might match the old, unreplaced integrity bit at the end of the physically stored page.

To avoid this possibility of undetectable inconsistent data, the NONZERO PHYSICAL PAGE log indicator is included in the page format log record written when a mass-deleted page is reformatted (line 329 of Table 3). The NONZERO PHYSICAL PAGE log indicator indicates that the format log record must be reapplied during a system restart, replacing the contents of the physically stored page with binary zeroes. Data base management systems which use write-ahead logging normally place a timestamp value in both the page header and the log record whenever a page is updated. Without the NONZERO PHYSICAL PAGE log indicator in the format±log record, during a restart the system would assume that the formerly mass-deleted, and now updated, page was successfully transferred to physical storage even if the page was in fact only partially transferred, because the timestamp in the physically stored page would match the timestamp of the log record. With the NONZERO PHYSICAL PAGE log indicator, the system will first set the page to binary zeroes, and then reset it with the newly-inserted data. This method of ensuring data integrity in the segmented tablespace 10 is based on the use of write-ahead logging, in which the data base management system is forced to write the updated log record before (ahead of) transferring the updated page to physical storage.

A pseudocode implementation of this method for ensuring data integrity is shown in Table 4.

TABLE 4

| | Pseudocode for Ensuring Data Integrity |
|---|---|
| 401 | IF a read I/O is initiated for a page request THEN /= check the integrity bits =/ |
| 402 | DO. |
| 403 | IF the integrity checking bits are not consistent THEN |
| 404 | Mark the page as damaged. |
| 405 | Recover the page from the log records. |
| 406 | ELSE. /= the integrity bits are consistent =/ |
| 407 | DO nothing. |
| 408 | END. |
| 409 | END. |
| : | |
| 410 | IF a page is to be transferred from a buffer to physical storage THEN DO. /= reset the integrity bits =/ |
| 411 | Invert the integrity bits /= i.e. change both bits to ONs if they =/ /= are currently set to OFFs, and to ON if =/ /= they are currently OFF =/ |
| 412 | END. |

The method of ensuring data integrity shown in Table 4 consists of two separate modules: one module for checking the integrity bits before reading data from a page, and a second module for setting the integrity bits when new data is written to a page. The first module, at lines 401–409, checks the integrity bits of pages 18 as they are about to be read (line 401). If the integrity bits at the beginning and end of the page do not contain the same value (line the page is marked as being damaged (line 404). Damaged pages are returned to their last consistent state by recovering the page using the log records (line 405). If the page's integrity bits are consistent, nothing is done (lines 406–408) and the page may immediately be read normally.

The second module of the data integrity method (lines 410–412) resets the integrity bits whenever a page is about to be transferred from a buffer to physical storage (line 410). Before such a transfer, the integrity bits are inverted. If the bits are currently ON, they are changed (inverted) to OFF, and if they are currently OFF, they are inverted to ON (line 401).

With the above method for ensuring data integrity in the segmented tablespace 10, this invention's methods for minimizing locking and reading of data pages can be used to significantly reduce the number of page accesses required during reading and insertion operations, thereby measurably improving the performance of the data base management system.

It will be understood that, although specific embodiments and implementations have been described above for purposes of illustration, various modifications may be made without departing from the spirit and scope of this invention. For example, this invention may be used in differently organized segmented tablespaces which nonetheless meet this invention's essential requirement that a data page's status be stored separately from the page so that unnecessary locking and reading of the page can be avoided. Furthermore, the invention is not limited to relational data base management systems, but may be used to advantage in other types of computerized data processing systems. Accordingly, the scope of protection of this invention is limited only by the following claims.

We claim:

1. In a physical storage space managed by a computerized database management system including at least one data storage device, the storage space consisting of two or more pages, a method for accessing those pages comprising the steps of:

(a) storing by the data storage device on any page data for no more than a single entity;

(b) storing by the data storage device separately from each page an indication of the status of that page;

(c) determining the status of a selected one of the pages based on the status indication thereof; and (d) if the selected page's status is such that the selected page contains only obsolete data because of a deletion of all of the data of the data entity stored on the selected page, accessing the selected page as if the selected page contains no data.

2. A method for accessing pages according to claim 1, further including the step of:
   (e) if the selected page's status is such that the selected page contains only obsolete data because of a deletion of less than all of the data of the data entity stored on the selected page, locking the selected page, and then reading the selected page only if it then contains current data.

3. A method for accessing pages according to claim 1, further comprising the step of:
   (e) locking the pages of the data entity during said deletion of all of a data entity's data;
   and wherein the accessing step (d) comprises the steps of:
   (i) if the selected page's status is such that the selected page contains at least some current data, locking and reading the selected page;
   (ii) if the selected page's status is such that the selected page contains only obsolete data because of a deletion of less than all of the data of the data entity stored on he selected page, locking the selected page and then reading the selected page only if the selected page then contains current data;
   (iii) if the selected page's status is such that the selected page contains no data, skipping the selected page; and
   (iv) if the selected page's status is such that the selected page contains only obsolete data because of a deletion of all of the data of the data entity stored on the selected page, skipping the selected page.

4. A method for accessing pages according to claim 1, further comprising the step of:
   (e) locking the storage space during a deletion of all of the data entity's data;
   and wherein the step (d) comprises the steps of:
   (i) if the selected page's status is such that the selected page contains current data, reading the selected page before inserting data thereinto;
   (ii) if the selected page's status is such that the selected page contains only obsolete data because of a deletion of less than all of the data of the data entity stored on the selected page, reading the selected page before inserting data thereinto;
   (iii) if the selected page's status is such that the selected page contains no data, inserting data thereinto without first reading the selected page;
   (iv) if the selected page's status is such that the selected page contains only obsolete data because of a deletion of all of the data of the data entity stored on the selected page, inserting data into the selected page without first reading the selected page.

5. A method according to claim 1, wherein step (b) comprises the steps of:
   for each page which is entirely full of current data, storing a first status indication;
   for each page which is partially full of current data, storing a second status indication;
   for each page which contains no data, storing a third status indication;
   for each page which contains only obsolete data as a result of an unqualified deletion of data, storing a fourth status indication; and
   for each page which contains only obsolete data because of a qualified deletion of data, storing a fifth status indication 6. A method for accessing pages according to claim 1, wherein the database management system comprises a relational database management system, and wherein the storage space comprises a relational table space.

* * * * *